Oct. 23, 1962  W. RESK  3,059,679
VEGETABLE-PEELING APPLIANCE
Filed May 13, 1960
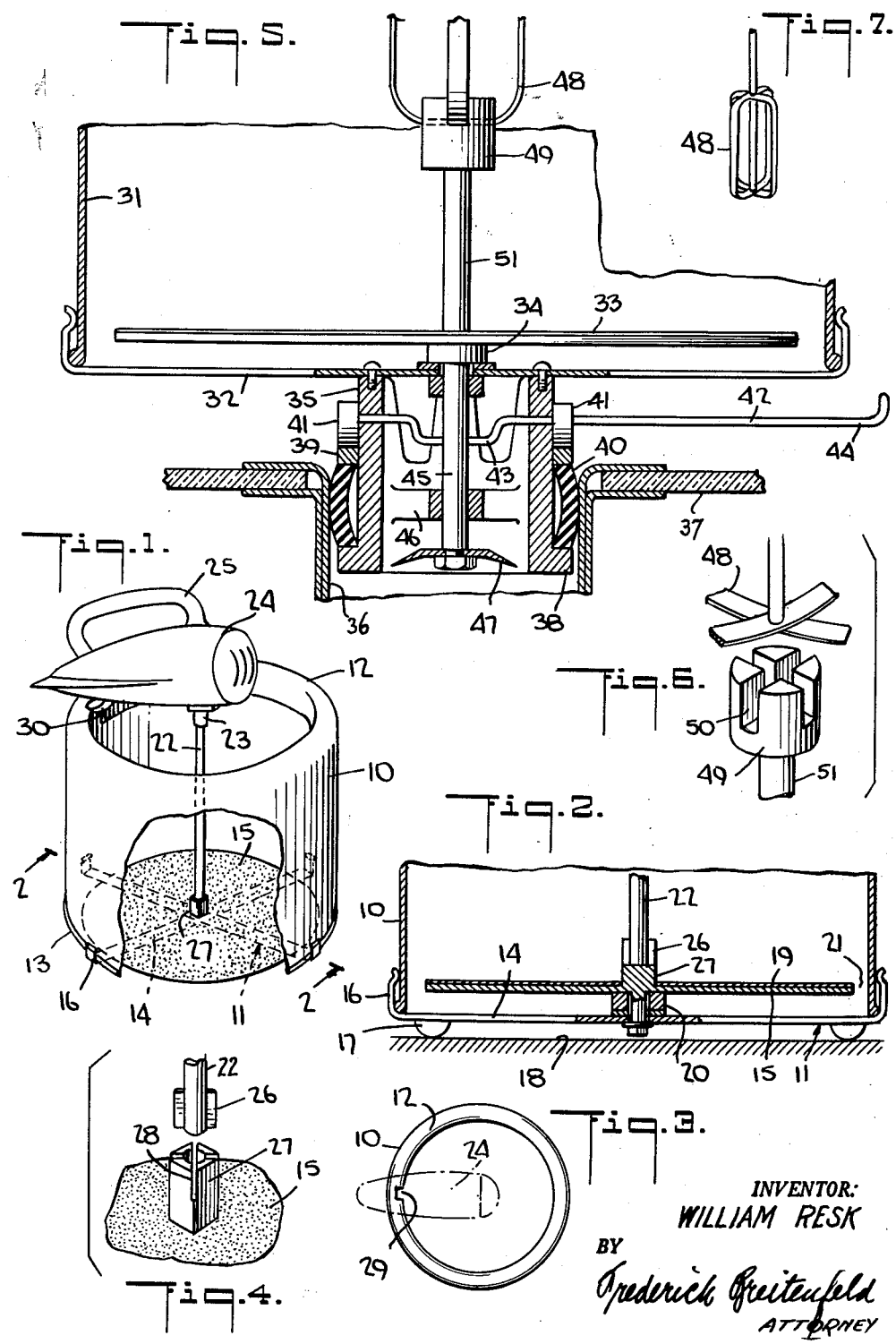
INVENTOR:
WILLIAM RESK
BY
Frederick Breitenfeld
ATTORNEY 3,059,679
VEGETABLE-PEELING APPLIANCE
William Resk, Scarsdale, N.Y., assignor to Peelquik Co., Inc., New Rochelle, N.Y., a corporation of New York
Filed May 13, 1960, Ser. No. 29,072
2 Claims. (Cl. 146—49)

This invention relates generally to food machinery, and has particular reference to vegetable peelers.

It is a general object of the invention to provide an improved device of the type which comprises an open-top vessel having a cylindrical side wall, an open-work bottom wall, and an abrasive-surfaced vegetable-supporting floor above said bottom wall and rotatively journaled therein. It is a more particular object to provide an appliance in which the floor may be rotatively driven from above, by a driving instrument insertable downwardly into the vessel through its open top.

It is a particular feature of the invention to provide the vegetable-supporting floor and the driving instrument with cooperable means whereby a separable driving interconnection may be established between them in an unusually simple and thoroughly practical manner. In a preferred embodiment of the invention, the floor is provided with a special tool-receiving device mounted in coaxial relation therewith, adapted to receive rotative impetus from a rotating tool insertable into the vessel through its open top, the parts being interengageable in a simple manner analogous to the engagement of a screw driver with the grooved head of a screw.

Preferably, the tool-receiving device carried by the rotatable floor is in the form of a socket provided with radial grooves adapted to receive the end of a correspondingly shaped egg-beater.

One of the primary objectives of the invention is to provide a construction that is of such reasonably small dimensions and so light in weight and easy to employ, that it will be useful in a practical manner as a household appliance. The device is so designed that it is easy to set up on the floor of a conventional sink, the bottom wall being elevated above the level of the sink floor, the vessel being adapted to receive water from above as the floor is rotated. The vegetables become peeled as they are thrown about by centrifugal force, and the debris flows around the periphery of the rotating floor, and thence downwardly through the open-work bottom wall into the sink.

The means for supporting the vessel in the sink may consist simply of legs extending downwardly from the bottom wall and adapted to rest upon the sink floor, or the appliance may be provided with a hollow stem concentric with and extending downwardly from the bottom wall, and with means for removably securing the stem within the drain opening of the sink.

Various alternatives are available in carrying out these general objectives, and several ways of accomplishing the purposes of the invention, and achieving its benefits and advantages, are illustrated in the accompanying drawings, in which—

FIG. 1 is a perspective view of an appliance embodying some of the features of the invention, some parts being omitted and others broken away for the sake of clearer illustration;

FIG. 2 is an enlarged fragmentary cross-sectional view along the line 2—2 of FIGURE 1;

FIG. 3 is a top view of the appliance showing its preferred general shape;

FIG. 4 is an enlarged perspective view of the details of one type of drive connection;

FIG. 5 is a view similar to FIG. 2, but on a larger scale, showing an alternative construction;

FIG. 6 is a view similar to FIG. 4, showing the alternative drive connection depicted in FIG. 5; and FIG. 7 is a perspective view of the driving tool.

The appliance shown in FIGS. 1–3 consists essentially of an open-top cylindrical vessel formed of a cylindrical side wall 10 and an open-work bottom wall 11. The wall 10 preferably has its upper edge turned inward as shown at 12 to provide a rounded contour and to minimize splashing when the device is in use. Its lower edge is preferably formed with an out-turned rim or bead 13. The bottom wall may consist of crossed straps 14 defining spaces or openings between them and affording a central bearing support for a rotatable floor 15. At their outer ends, the straps or bottom wall elements 14 may have upturned springy fingers 16 adapted frictionally to engage the lower margin of the cylindrical wall 10. This allows the parts 10 and 11 to be joined in readily separable fashion to facilitate cleaning. Fasteners other than springy fingers may obviously be employed, if desired, or the parts 10 and 11 may be fabricated in a manner which leaves them permanently joined together.

Legs 17 may be formed or mounted on the elements 14 to support the device on the floor 18 of a sink with the bottom wall 11 elevated above the level of the sink floor by any desired appreciable amount, e.g., an inch or so.

The floor 15 is abrasively surfaced as indicated at 19 (FIG. 2) and is rotatively journaled in the bottom wall 11 by any appropriate spindle-bearing assembly 20. The floor 15 is smaller in diameter than the inner diameter of the side wall 10 so that a space 21 is available around the periphery of the floor for water and debris to flow downwardly out of the vessel into the sink.

The floor 15 is provided with a tool-receiving device in coaxial relation to it so that it may receive rotative impetus from a rotating tool insertable into the vessel through its open top. In FIGS. 1–4 the driving tool has been shown in the form of a rod 22 removably mounted in the driving socket 23 of a conventional motor-driven beater 24 provided with a hand grip 25. The lower end of the rod 22 has radially projecting ribs or driving blades such as the two diametrically arranged ribs 26 best shown in FIG. 4, and the tool-receiving device is an appropriately grooved upwardly open socket such as the socket 27 having one or two sets of diametrically opposed slots or grooves 28 to receive the fins or ribs 26. The socket 27 may be of any desired height, preferably rather low as shown.

In using the appliance, the vegetables or other articles to be peeled are placed upon the rotatable floor 15, and the beater 24 is manipulated to project the driving tool 22 downwardly into the vessel and into driving interconnection with the socket 27. Obviously, the rod 22 must be of adequate length with respect to the height of the vessel. While dimensions may be varied to suit requirements, it has been found in practice that for the average household a vessel about 8 inches tall and from 8 to 10 inches in diameter is satisfactory. When the tool 22 is set into action the floor 15 is correspondingly rotated, as a result of which the vegetables are flung about and become peeled with surprising rapidity under the abrasive action to which they are subjected. Preferably the vessel is so positioned in the sink that water from the faucet may be directed downwardly into the vessel while the peeling action is taking place. The flowing water facilitates the desired operation and carries debris out of the vessel into the sink. When the peeling has been accomplished, the tool 22 is withdrawn and the peeled vegetables may be lifted out.

If desired, the upper rim of the vessel may be provided with an instrument rest so that the beater 24 need not be continuously held in the hand. Any appropriately shaped rest may be employed. By way of example the rim of the vessel may be provided with a notch 29 (FIG. 3) and the instrument 24 may be provided on its under surface with a correspondingly shaped hook or projection 30 (FIG. 1) by means of which a steady suitably balanced interlock may be readily established.

An alternative mounting arrangement for the appliance is shown in FIG. 5. In this case the vessel consists, as before, of a cylindrical side wall 31, an open-work bottom wall 32, and an abrasive-surfaced floor 33 above the wall 32 and rotatively journaled in it, as at 34. The legs 17 of FIGS. 1-2 may be supplanted (or augmented) by a hollow open-walled stem structure 35 which is secured concentrically to the bottom wall 32 and extends downwardly from it. Means are provided for removably securing this stem within the drain opening 36 of the sink 37. The device illustrated involves a fixed flange 38 on the stem 35, an axially movable ring 39, a flexible band 40 of rubber or the like interposed between the parts 38, 39, and a means for squeezing these parts together after the device has been inserted in the drain opening, so that the band 40 is forcibly expanded into frictional clamping relation to the inner wall of the drain opening. To establish this clamping action, and to release it when the appliance is to be removed, a pair of cams 41 are mounted on a horizontal rod 42 which is journaled in the stem 35 to bring the cams 41 into operative contact with the movable ring 39. Where the rod 42 is arranged along a diameter of the stem 35 it may be provided with an offset part 43 in the axial region, as shown. The rod 42 extends outward to an extent sufficient to make its end 44 accessible, so that it may be grasped and rotated to force the cams 41 against the ring 39.

The vessel of FIG. 5 may be additionally provided with legs (not shown) to rest upon the sink floor, whereby the weight of the appliance is more uniformly sustained.

The spindle of the rotatable floor 33 may be provided with a downward extension 45 journaled in the spider 46 and carrying a comminuter 47 at its lower end. The stem 35 is open-walled, that is, it is of skeletal structure so that water and debris from the sink may find its way into the interior of the stem and thus flow into the drain opening. As this flow occurs, and the element 47 is rotated, it will help to chop or comminute the larger peelings.

The structure shown in FIG. 5 includes also an alternative driving means, the details of which are best revealed in FIGS. 6 and 7. The tool that drives the floor 33 is in this case a conventional four-bladed egg-beater 48, adapted to be removably secured to one of the sockets of a motor-driven beater of known kind such as that shown in FIG. 1. The blades of the beater define a cross-shaped tool where they intersect at their lower ends, and are thus admirably suited for readily separable application to, and interlock with, a correspondingly shaped tool receptacle 49. This receptacle or socket is provided with crossed slots 50 into which the crossed blades may enter to establish a driving connection. The part 49 may be advantageously composed of nylon or equivalent low-friction wear-resistant material.

Because of the fact that an egg-beater of this kind has a lateral dimension of appreciable magnitude, it is necessary to elevate the socket 49 above the floor 33 by mounting it upon a central post 51 secured to the floor. The height should be adequate to allow vegetables of average size to rest on the floor in the region around the post 51 without encountering the lower end of the driving tool 48.

The driving impetus imparted to the floor 33 by the tool 48 is effective, as previously described, to tumble the vegetables so that they quickly become peeled by abrasive action. The action preferably takes place under a constant flow of water into the vessel from above and out of the vessel through the bottom wall.

It will be understood that many of the details herein described and illustrated may be modified without necessarily departing from the spirit and scope of the invention as expressed in the appended claims.

What is claimed is:

1. A vegetable peeling appliance comprising an open-top vessel having a cylindrical side wall and an open bottom wall, means for supporting said vessel in a sink with said bottom wall elevated above the level of the sink floor, an abrasive-surfaced vegetable-supporting floor above the bottom wall and rotatively journalled therein, a socket member carried by said floor and extending above the same, a motor-driven tool provided with a rotated shaft carrying driving blades at its end adapted to be coupled to the socket member, said socket member being slotted to receive the driving blades whereby the socket member and the floor attached thereto will be rotated by the operation of said tool, the tool being readily detachable from said socket member by the elevation of its blades out of coupled engagement therewith, a vertical shaft extending downwardly from the floor and journalled in the bottom wall, said vessel-supporting means comprising a hollow stem concentric with said shaft and extending downwardly from said bottom wall, means for removably securing said stem within the drain opening of the sink comprising a compressible sleeve disposed around the stem, means operative on the sleeve to compress the same axially and to expand it laterally against the wall of the drain opening, and a comminuting element carried by the shaft and positioned within the stem.

2. A vegetable peeling appliance as defined in claim 1, wherein the stem is provided with a radial flange at its lower end, the compressible sleeve being supported on said flange, and the sleeve-compressing means consisting of cam means operative on the top edge of the sleeve to compress and expand the same.

References Cited in the file of this patent

UNITED STATES PATENTS

| | | |
|---|---|---|
| 1,075,119 | Reichner | Oct. 7, 1913 |
| 2,286,352 | Eakins | June 16, 1942 |
| 2,289,645 | Geistert | July 14, 1942 |
| 2,552,972 | Jepson | May 15, 1951 |
| 2,745,644 | Von Behren | May 15, 1956 |
| 2,781,175 | Metzger | Feb. 12, 1957 |
| 2,850,268 | Miller et al. | Sept. 2, 1958 |
| 2,953,308 | Isola | Sept. 20, 1960 |

OTHER REFERENCES

Popular Mechanics, vol. 99, issue 3; p. 120, March 1953.